(12) United States Patent  (10) Patent No.: US 8,750,484 B2
Fletcher  (45) Date of Patent: Jun. 10, 2014

(54) USER-PROGRAMMABLE CALL PROGRESS TONE DETECTION

(75) Inventor: Ronald Lee Fletcher, Jackson, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1283 days.

(21) Appl. No.: 11/687,890

(22) Filed: Mar. 19, 2007

(65) Prior Publication Data

US 2008/0232573 A1   Sep. 25, 2008

(51) Int. Cl.
*H04M 7/00* (2006.01)
*H04M 1/64* (2006.01)
*H04M 3/42* (2006.01)
*H04M 3/00* (2006.01)
*H04M 5/00* (2006.01)
*G10L 15/00* (2013.01)
*G10L 17/00* (2013.01)

(52) U.S. Cl.
USPC ............. 379/221.01; 379/88.01; 379/211.02; 379/212.01; 379/265.05; 379/273

(58) Field of Classification Search
USPC ................. 379/221, 386, 197, 88.01, 265.07, 379/221.01, 211.02, 212.01, 265.05, 273, 379/272, 271; 704/231, 246; 705/18
See application file for complete search history.

(56) References Cited

U.S. PATENT DOCUMENTS

| | | | |
|---|---|---|---|
| 4,232,199 A * | 11/1980 | Boatwright et al. | 379/197 |
| 5,406,621 A | 4/1995 | Binal | |
| 5,818,909 A * | 10/1998 | Van Berkum et al. | 379/265.07 |
| 6,173,054 B1 * | 1/2001 | Beyda et al. | 379/386 |
| 6,529,881 B2 * | 3/2003 | Morganstein et al. | 705/18 |
| 6,850,602 B1 | 2/2005 | Chou | |
| 7,043,006 B1 | 5/2006 | Chambers et al. | |
| 7,349,843 B1 * | 3/2008 | Beck | 704/231 |
| 2004/0170258 A1 * | 9/2004 | Levin et al. | 379/88.01 |

FOREIGN PATENT DOCUMENTS

| | | |
|---|---|---|
| JP | 11187156 A | 7/1999 |
| JP | 2004336151 A | 11/2004 |
| JP | 2006345181 A | 12/2006 |
| WO | 2006076347 A2 | 7/2006 |

OTHER PUBLICATIONS

M. Tillgren, "Application No. PCT/US2008/056538 International Search Report and Written Opinion", Jul. 15, 2008, Publisher: PCT, Published in: EPO.
Tillgren, Mattias, "PCT Application No. PCT/US2008/056538 International Search Report", Feb. 6, 2009, Publisher: EPO, Published in: EP.

(Continued)

*Primary Examiner* — Thjuan K Addy
(74) *Attorney, Agent, or Firm* — Kacvinsky Daisak Bluni PLLC; John Maldjian; Alexander D. Walter

(57) ABSTRACT

A telecommunications system is disclosed that enables a telecommunications switch to be "user" programmable in the "field"—in contrast to only programmable by the manufacturer or third-party software company—with audio samples. Each audio sample is exemplar of a sound that might be encountered during or after the establishment of a telecommunications call that is handled by the telecommunications switch. In accordance with the illustrative embodiment, the audio samples are received by the telecommunications switch through one or more of the same ports that the telecommunications switch uses to route calls, in contrast to programs and program data that are received by the telecommunications switch through a programming port.

11 Claims, 6 Drawing Sheets

Telecommunications System 100

(56) References Cited

OTHER PUBLICATIONS

Morris, Euros, "GB Application No. GB0916113.4 Office Action Feb. 24, 2011",, Publisher: UK IPO, Published in: GB.

Notice of Preliminary Rejection dated Mar. 26, 2013, Korean Patent Application No. 2009-7019470, Avaya, Inc., 2 pages.

Notice of Preliminary Rejection dated Aug. 28, 2012, Korean Patent Application No. 2009-7019470, Avaya, Inc., 2 pages.

Notice of Final Rejection dated May 9, 2013, Japanese Patent Application No. 2009-554638, Avaya, Inc., 2 pages.

Avaya Inc., Japanese Patent Application No. 2009-554638, Office Action dated Nov. 8, 2012, 5 pages.

German Office Action for Patent Application No. 112008000684.9, dated Jan. 10, 2014 (76 pages).

\* cited by examiner

USER-PROGRAMMABLE CALL PROGRESS TONE DETECTION

FIELD OF THE INVENTION

The present invention relates telecommunications in general, and, more particularly, to the design of telecommunications switches.

BACKGROUND OF THE INVENTION

Direct-marketing is often accomplished by calling potential customers in an outbound call campaign. Outbound call campaigns have very low rates of success, and, therefore, need to be efficient. One factor that affects an outbound call campaign's efficiency is the utilization of human sales agents. When a sales agent just sits there waiting for the called party to answer a call, the sales agent's time is being wasted. Clearly, this is inefficient.

To address this inefficiency, telecommunications switches have been built that automatically place telephone calls and wait for the called party to answer before transferring the call to an available sales agent. The telecommunications switch knows that the call has been answered by a human waiting and not, for example, but a fax machine or an answering machine by listening to sounds made by the other end. This addresses some of the disadvantages of telecommunications switches in the prior art, but not all of them, and, therefore, the need exists for new inventions in the design of telecommunications switches.

SUMMARY OF THE INVENTION

The present invention enables the design and operation of telecommunications switches that avoid some of the costs and disadvantages of telecommunications switches in the prior art. One disadvantage of telecommunications switches in the prior art is that the sounds that they listen for are coded for by the manufacturer of the telecommunications switch. This is disadvantageous because it makes it impossible for the user of the telecommunications switch to be able to change the sounds without having the manufacturer make the changes. In general, this is a slow and expensive process.

To remedy this situation, the illustrative embodiment of the present invention enables a telecommunications switch to be "user" programmable in the "field"—in contrast to only programmable by the manufacturer or third-party software company—with audio samples. Each audio sample is exemplar of a sound that might be encountered during or after the establishment of a telecommunications call that is handled by the telecommunications switch. In accordance with the illustrative embodiment, the audio samples are received by the telecommunications switch through one or more of the same ports that the telecommunications switch uses to route calls, in contrast to programs and program data that are received by the telecommunications switch through a programming port.

The illustrative embodiment comprises; receiving a first audio sample at a switch via a first bi-directional telecommunications port; receiving a first telecommunications call on a second bi-directional telecommunications port; and setting a first flag because an instance of the first audio sample occurs in the first telecommunications call.

DETAILED DESCRIPTION

Figure 1:
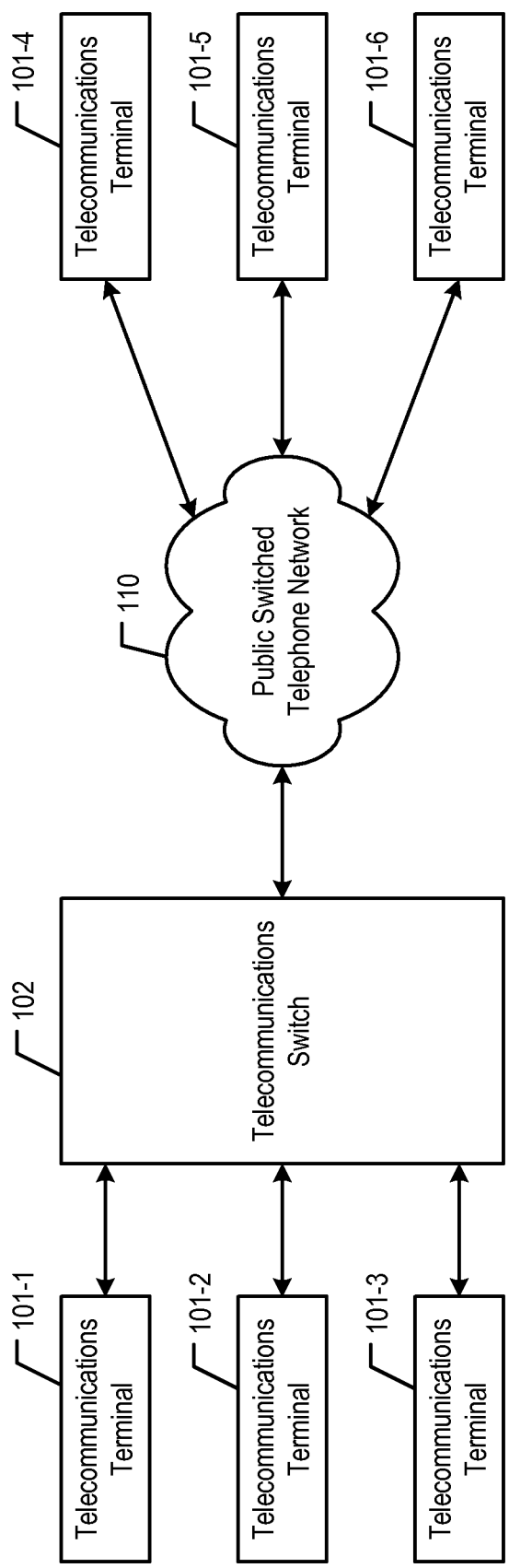
FIG. 1 depicts a schematic diagram of a portion of a typical telecommunications system.

FIG. 1 depicts a schematic diagram of the salient components of telecommunications system 100 in accordance with the illustrative embodiment of the present invention. Telecommunications system 100 comprises: telecommunications terminals 101-1, 101-2, 101-3, 101-4, 101-5, and 101-6, telecommunications switch 102, and Public Switched Telephone Network (PSTN) 110, interconnected as shown.

Although the illustrative embodiment comprises three telecommunications terminals connected directly to telecommunications switch 102 and three telecommunications terminals connected to telecommunications switch 102 via Public Switched Telephone Network 110, it will be clear to those skilled in the art, after reading this specification, how to make and use alternative embodiments of the present invention that comprise:

i. any number of telecommunications terminals that are connected directly to telecommunications switch 102, or ii. any number of telecommunications terminals that are connected to telecommunications switch 102 via Public Switched Telephone Network 110, or iii. any combination of i and ii.

In accordance with the illustrative embodiment, telecommunications terminal 101-$i$, wherein $i \in \{1, 2, 3, 4, 5, 6\}$, is a device (e.g. a wireless, hands-free telephone headset, desk telephone, etc.) that is capable of performing the functionality described below and in the accompanying figures. For example, telecommunications terminal 101-$i$ provides bi-directional audio communications service to one or more users. Although the illustrative embodiment comprises identical telecommunications terminals, it will be clear to those skilled in the art, after reading this specification, how to make and use embodiments of the present invention in which some or all of the telecommunications terminals are identical. It will be clear to those skilled in the art, after reading this specification, how to make and use telecommunications terminal 101-$i$.

Telecommunications switch 102 is a switch that is capable of performing the functionality described below and the accompanying figures. For example, telecommunications switch 102 establishes telecommunications calls between terminals 101-1, 101-2, 101-3, 101-4, 101-5, and 101-6, scans those calls for occurrences of audio samples that have been provided to telecommunications switch 102, and handles the calls accordingly based on the occurrence of the audio signals. The details of how to make and use telecommunications switch 102 are described in detail below and in the accompanying figures.

Public Switched Telephone Network 110 is the Public Switched Telephone Network as is well known to those skilled in the art. Although the illustrative embodiment uses the Public Switched Telephone Network, it will be clear to those skilled in the art, after reading this specification, how to make and use alternative embodiments of the present invention that use a different network (e.g., the Internet, etc.).

Figure 2:
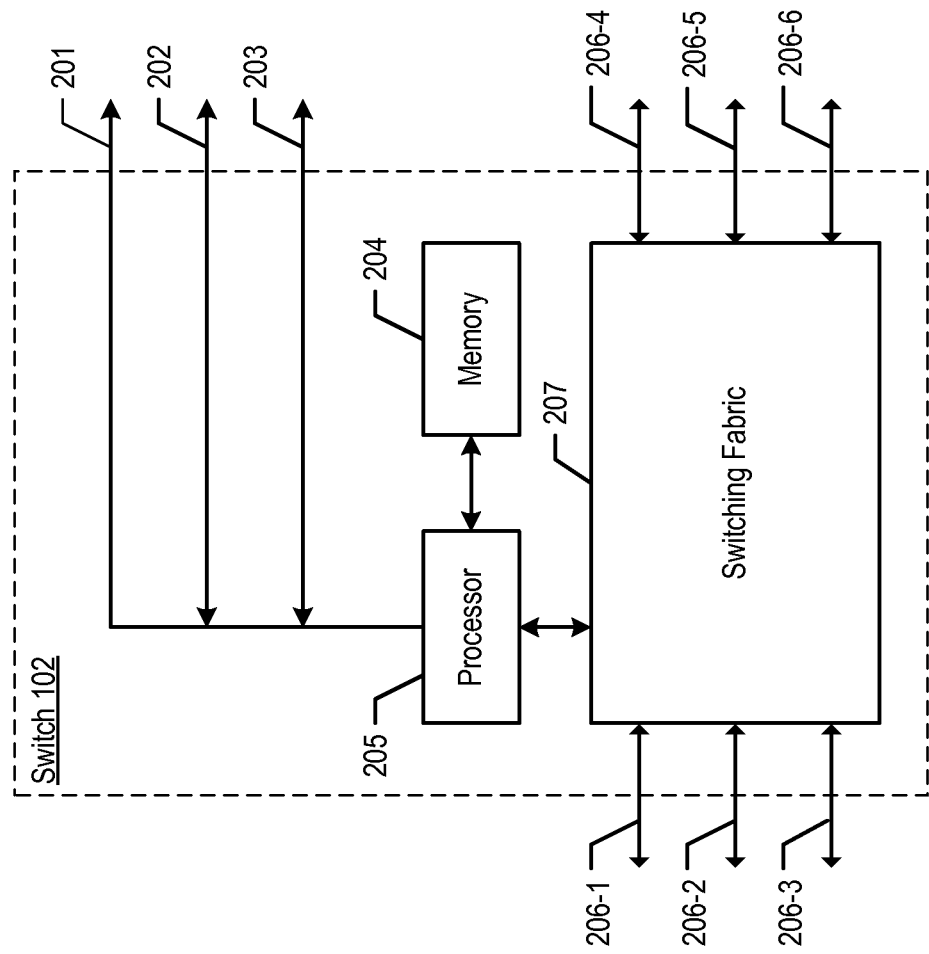
FIG. 2 depicts a block diagram of the components of telecommunications switch 102.

FIG. 2 is a block diagram of the salient components of telecommunications switch 102 in accordance with the illustrative embodiment of the present invention. Telecommunications switch 102 comprises:

i. administrative interface port 201, and
 ii. programming port 202, and
 iii. signaling port 203, and
 iv. memory 204, and
 v. processor 205, and
 vi. telecommunications ports 206-1, 206-2, 206-3, 206-4, 206-5, and 206-6, and
 vii. switching fabric 207, interconnected as shown. It will be clear to those skilled in the art, after reading this specification, how to make and use alternative embodiments of the present invention in which telecommunications switch 102 comprises any subcombination of i, ii, iii, iv, v, vi, and vii.

In accordance with the illustrative embodiment, telecommunications switch 102 is a single integrated device, however, it will be clear to those skilled in the art, after reading this specification, how to make and use alternative embodiments of the present invention in which telecommunications switch 102 comprises one or more telecommunications switches and one or more general-purpose computers that run computer telephony integration software.

Administrative interface 201 is the mechanism by which the administrator of telecommunications system administers telecommunications switch 102. In accordance with the illustrative embodiment, administrative interface 201 comprises a graphic user interface and a reset button. It will be clear to those skilled in the art, after reading this specification, how to make and use administrative interface 201.

Programming port 202 enables the delivery of programs and program data to telecommunications switch 102 by the manufacturer of telecommunications switch 102. It will be clear to those skilled in the art how to make and use programming port 202.

Signaling port 203 enables telecommunications switch 102 to exchange signaling information with Public Switched Telephone Network 110, in well known fashion. It will be clear to those skilled in the art how to make and use signaling port 203.

Memory 204 is non-volatile memory that stores programs, program data, and audio samples for telecommunications switch 102. The programs instruct processor 205 how to act. The program data comprises audio samples and/or characterizations of audio signals that processor 205 listens for, in task 303 during the establishment and after the establishment of a call. Task 301 is performed as often as necessary or advantageous. It will be clear to those skilled in the art how to make and use memory 204.

Processor 205 is a general purpose processor that performs the tasks described below and in the accompanying figures. It will be clear to those skilled in the art how to make and use processor 205.

Telecommunications ports 206-1, 206-2, 206-3, 206-4, 206-5, and 206-6 are local and trunk ports providing communications services to telecommunications terminals 101-1, 101-2, 101-3, 101-4, 101-5, and 101-6 and for receiving audio samples as described in detail below. It will be clear to those skilled in the art how to make and use telecommunications ports 206-1, 206-2, 206-3, 206-4, 206-5, and 206-6.

Switching fabric 207 is circuitry that interconnects telecommunications ports 206-1, 206-2, 206-3, 206-4, 206-5, and 206-6, and processor 205. It will be clear to those skilled in the art how to make and use switching fabric 207.

Figure 3:
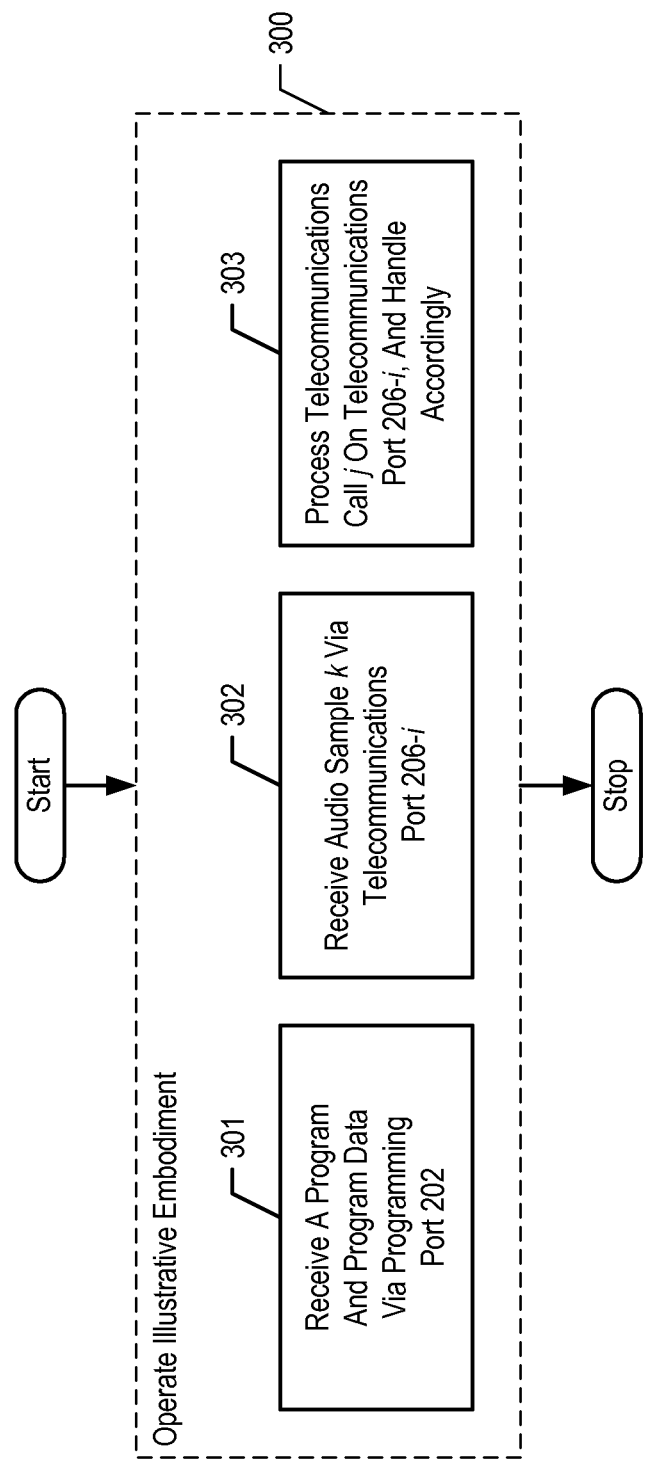
FIG. 3 depicts a flow chart of the salient tasks of the illustrative embodiment of the present invention.

FIG. 3 depicts a flowchart of the salient tasks performed in accordance with the operation of the illustrative embodiment. In accordance with the illustrative embodiment, the three tasks depicted in FIG. 3 are performed concurrently, but it will be clear to those skilled in the art, after reading this specification, how to make and use alternative embodiments of the present invention in which the three tasks depicted in FIG. 3 are not performed concurrently.

At task 301, telecommunications switch 102 receives a program and program data via programming port 202, which program and program data are created by the manufacturer of telecommunications switch 102 or a third-party entity. It will be clear to those skilled in the art, after reading this specification, how to make and use embodiments of the present invention that accomplish task 301.

At task 302, telecommunications switch 102 receives audio sample k via telecommunications port 206-$i$, wherein k is an integer that is unique to each audio sample that is received by telecommunication switch 102, and wherein $i \in \{1, 2, 3, 4, 5, 6\}$. Audio sample k is an exemplar of a sound that might be encountered during or after the establishment of a telecommunications call that is handled by telecommunications switch 102. Task 302 is performed each time an audio sample is provided to telecommunications 102.

In contrast to the programs and program data received in task 301, the audio samples are created by the end-user of telecommunications switch 102 and fed into telecommunications switch 102 by the end-user. This enables telecommunications switch 102 to be "user" programmable with new audio samples in the "field," in contrast with telecommunications switches in the prior art that are programmed with new audio samples solely by the manufacturer, in the form of program data, through the programming port. When telecommunications switch 102 receives audio sample k via telecommunications port 206-$i$, processor 205 stores audio sample k in memory 204 for use in task 303. It will be clear to those skilled in the art, after reading this specification, how to make and use embodiments of the present invention that accomplish task 302.

At task 303, telecommunications switch 102 processes telecommunications call j on telecommunications port 206-$i$, scans telecommunications call j for each occurrence of audio sample k, and handles telecommunications call j accordingly. The details of task 303 are described below and in the accompanying figures. It will clear to those skilled in the art how to make and use embodiments of the present invention that accomplish task 303.

Figure 4:
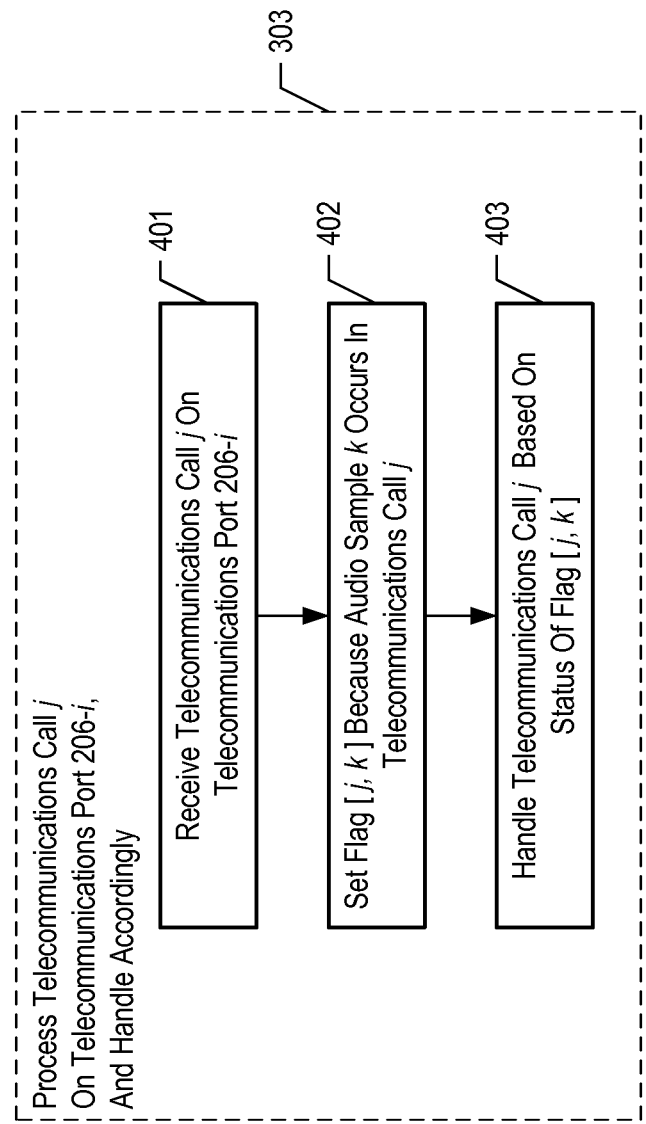
FIG. 4 depicts a flow chart of the salient tasks involved in carrying out task 303 in the illustrative embodiment of the present invention.

FIG. 4 depicts a flowchart of the salient tasks associated with task 303, the processing of telecommunications call j.

At task 401, telecommunications switch 102 processes telecommunications call j on telecommunications port 206-$i$. In accordance with the illustrative embodiment, telecommunications call j is a call initiated by telecommunications switch 102 itself—either under its own programming or under the direction of a third-party computer-telephony-integration application—as part of an outbound call campaign. However, it will be clear to those skilled in the art how to make and use alternative embodiments in which telecommunications call j is not initiated by telecommunications switch 102, but is initiated by one of telecommunications terminals 101-1 through 101-6. It will be clear to those skilled in the art how to make and use embodiments of the present invention which accomplish task 401.

At task 402, telecommunications switch 102 continually scans telecommunications call j—both during and after its establishment—and sets flag [j, k] upon the detection of an occurrence of audio sample k in telecommunications call j. In accordance with the illustrative embodiment a match is determined based solely on tonal characteristics of the audio signal. However, it will be clear to those skilled in the art, after reading this specification how to make and use alternative embodiments of the present invention in which the match is determined based on other characteristics of the audio signal, including, but not limited to:

i. semantic content, or
   ii. amplitude characteristics, or
   iii. musical characteristics (e.g. key, cadence, time signature, etc.), or
   iv. background noise level, or
   v. distortion spectrum, or
   vi. dynamic range, or
   vii. tonal characteristics, or
   viii. any combination of i, ii, iii, iv, v, vi, and vii.

At task 403, telecommunications switch 102 handles telecommunications call j based on the status of flag [j, k]. When flag [j, k] is set, processor 205 takes an action with respect to telecommunications call j as described in detail below and in the accompanying figures.

Figure 5:
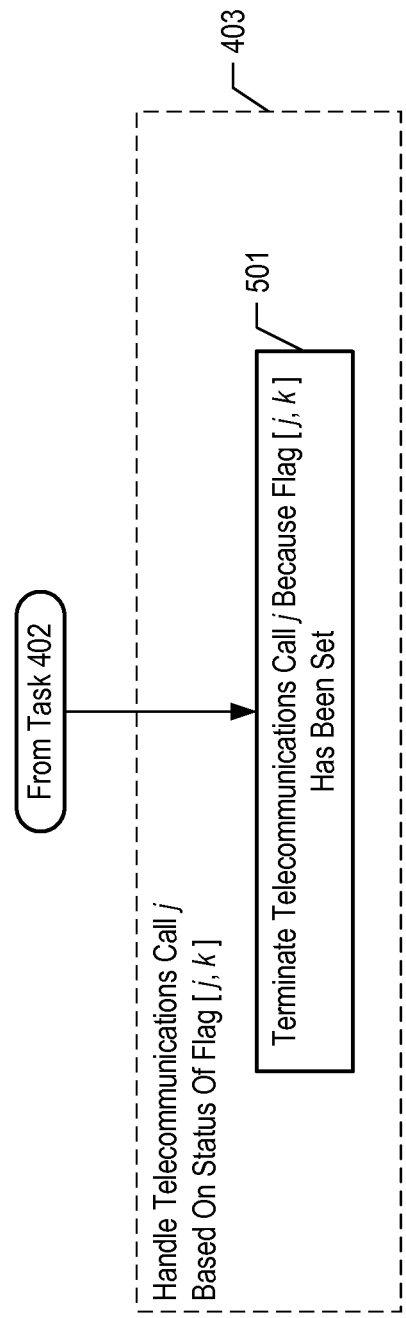
FIG. 5 depicts a flow chart of the salient task involved in carrying out task 403 in the illustrative embodiment of the present invention.

FIG. 5 depicts a flowchart of the details of task 403 in accordance with the first illustrative embodiment of the present invention.

At task 501, telecommunications switch 102 terminates telecommunications call j when flag [j, k] is set. It will be clear to those skilled in the art how to make and use embodiments of the present invention that accomplish task 501.

Figure 6:
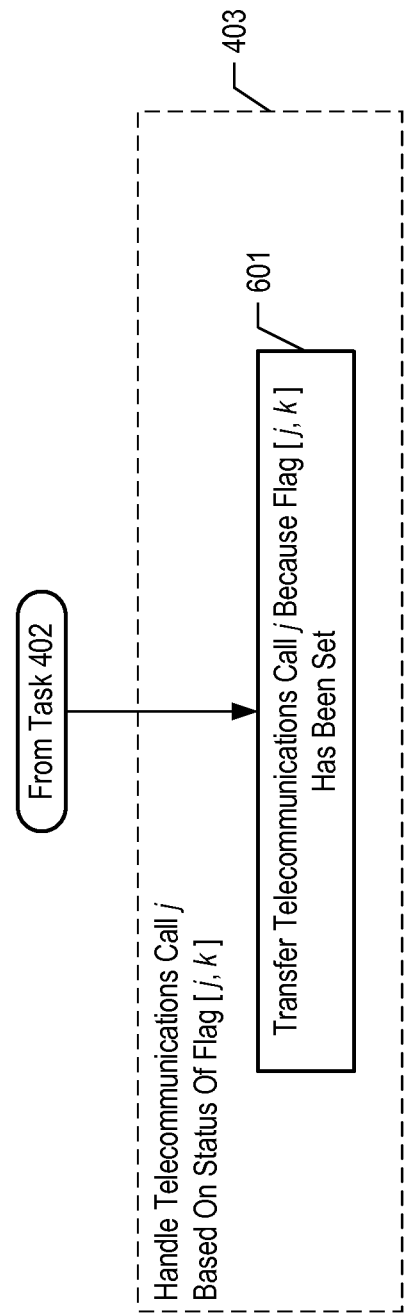
FIG. 6 depicts a flow chart of the salient task involved in carrying out task 403 in an alternative embodiment of the present invention.

FIG. 6 depicts a flowchart of the details of task 403 in accordance with the second illustrative embodiment of the present invention.

At task 601 telecommunications switch 102 transfers telecommunications call j to telecommunications terminals 101-1, 101-2, 101-3, 101-4, 101-5, and 101-6 via and available one of telecommunications ports 206-1, 206-2, 206-3, 206-4, 206-5, and 206-6 when flag [j, k] is set. It will be clear to those skilled in the art how to make and use embodiments of the present invention that accomplish task 601.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

What is claimed is:

1. A method comprising:
receiving a first audio sample and a second audio sample via at least one of a plurality of bi-directional telecommunications ports of a switch;
storing the first audio sample in a memory;
storing the second audio sample in a memory;
receiving a telecommunications call on one of said plurality of bi-directional telecommunications ports;
when an instance of said first stored audio sample occurs during or after the establishment of said telecommunications call, transferring said telecommunications call to a sales agent; and
when an instance of said second stored audio sample occurs during or after the establishment of said telecommunications call, terminating said telecommunications call.

2. The method of claim 1 wherein said telecommunications call is transferred to said sales agent via a different bi-directional telecommunications port than the one on which said call was received.

3. The method of claim 1 further comprising: receiving a program and program data via a programming port of said switch.

4. The method of claim 1 wherein said telecommunications call is received after said audio sample on the same bi-directional telecommunications port of said switch.

5. The method of claim 1 wherein said telecommunications call is received on a different bi-directional telecommunications port than said audio sample.

6. The method of claim 1 wherein said instance of said audio sample occurs during the establishment of said telecommunications call.

7. The method of claim 1 wherein said instance of said audio sample occurs after the establishment of said telecommunications call.

8. A method comprising:
receiving a first audio sample at a switch via a first bi-directional telecommunications port;
receiving a second audio sample at said switch via a second bi-directional telecommunications port;
storing the first audio sample and the second audio sample in a memory;
receiving a telecommunications call at said switch on a third bi-directional telecommunications port;
when an instance of at least one of said first stored audio sample and said second stored audio sample occurs during or after the establishment of said telecommunications call, transferring said telecommunications call to a sales agent; and
when an instance of at least one of said first stored audio sample and said second stored audio sample occurs during or after the establishment of said telecommunications call, terminating said telecommunications call.

9. The method of claim 8 further comprising: receiving a program and program data via a programming port of said switch.

10. The method of claim 8 wherein said instance of said first audio sample occurs during the establishment of said telecommunications call.

11. The method of claim 8 wherein said instance of said first audio sample occurs after the establishment of said telecommunications call.

\* \* \* \* \*